Patented Nov. 29, 1949

2,489,354

UNITED STATES PATENT OFFICE 2,489,354

BENZOTRIAZINES

Frank J. Wolf, Westfield, and Karl Pfister, III,
Elizabeth, N. J., assignors to Merck & Co., Inc.,
Rahway, N. J., a corporation of New Jersey No Drawing. Application January 10, 1947,
Serial No. 721,471

5 Claims. (Cl. 260—248)

This invention relates to new organic chemical compounds possessing therapeutic activity, and to methods by which they may be prepared from readily available starting materials. More particularly the invention relates to the preparation of 7-halogen-3 chloro-benzotriazine-1,2,4-oxide-1, and to the chemical compounds so produced, which are useful intermediates in the preparation of complex organic compounds including antimalarial agents and dyes.

The new compounds of the present invention are prepared from 7-halogen-3-hydroxy-benzotriazine-1,2,4-oxide-1 which can readily be obtained by reacting a 4-halogen-2-nitroaniline with phosgene in organic solvent solution, treating the reaction mixture thus obtained with anhydrous ammonia to form the corresponding 4-halogen-2-nitrophenyl urea, reacting this product with sodium hydroxide and then acidifying to precipitate the desired product, as fully described in our companion application, Serial No. 721,470 filed January 10, 1947.

In carrying out the process of the present invention a 7-halogen-3-hydroxy-benzotriazine-1,2,4-oxide-1 is chlorinated with a solution consisting of phosphorus oxychloride and a dialkyl aniline compound such as dimethyl aniline, diethyl aniline, or the like, yielding the corresponding 7-halogen-3-chlorobenzotriazine-1,2,4-oxide-1, as expressed by the following diagram:

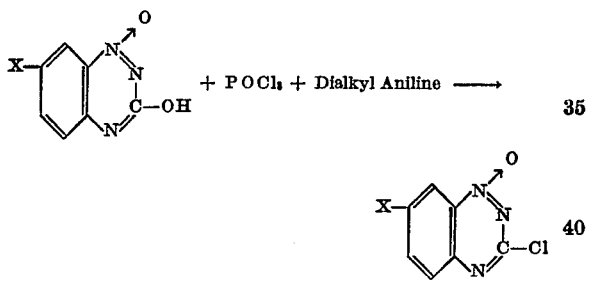

wherein X is halogen.

The product is recovered by slurrying the precipitate formed in the reaction with hot hydrochloric acid, (about 8 N) to remove any alkyl aniline compound, and then washing with water. The product can be further purified by recrystallization from alcohol.

The following example shows how the process of the present invention can be carried out, but it is to be understood that this example is given by way of illustration and not of limitation.

Example 25 gms. of 7-chloro-3-hydroxy-benzotriazine-1,2,4-oxide-1 is dissolved in 50 ml. of dimethyl aniline and 100 ml. of phosphorus oxychloride and refluxed for ¾ hour. The mixture is cooled and quenched in 1500 ml. of an ice-water bath.

The precipitate is slurried with 300 ml. of hot 8N hydrochloric acid to remove any methyl aniline compound and washed with water. The insoluble material consisting of crude 3,7-dichlorobenzotriazine-1,2,4-oxide-1 weighs 20.7 gms., M. P. 149–152° C., 75.4% of the theoretical amount. Recrystallization from alcohol gives a melting point of 153-4° C.

Other 7-halogen-3-chloro-benzotriazine-1,2,4-oxide-1 compounds can be prepared by treating corresponding 7-halogen - 3 - hydroxy-benzotriazine-1,2,4-oxide-1 compounds as described in the foregoing example.

Modifications can be made in the procedures herein described without departing from the spirit and scope of the present invention, and we are to be limited only by the appended claims.

We claim:

1. 7-halogen - 3 - chloro-benzotriazine - 1, 2, 4-oxide-1.
2. 3,7-dichloro-benzotriazine-1,2,4-oxide-1.
3. The process that comprises reacting 7-halogen-3-hydroxy-benzotriazine-1,2,4-oxide-1 with phosphorus oxychloride and a dialkyl aniline compound thereby forming the corresponding 7-halogen-3-chloro-benzotriazine-1,2,4-oxide-1.
4. The process that comprises reacting 7-chloro-3-hydroxy-benzotriazine-1,2,4-oxide-1 with phosphorus oxychloride and a dialkyl aniline compound thereby forming 3,7-dichloro-benzotriazine-1,2,4-oxide-1.
5. The process that comprises reacting 7-chloro-3-hydroxy-benzotriazine-1,2,4-oxide-1 with phosphorus oxychloride and dimethyl aniline thereby forming 3,7-dichloro-benzotriazine-1,2,4-oxide-1.

FRANK J. WOLF.
KARL PFISTER, III.

REFERENCES CITED

The following references are of record in the file of this patent:

UNITED STATES PATENTS

| Number | Name | Date |
|---|---|---|
| 1,904,229 | Heintrich | Apr. 18, 1933 |
| 2,235,480 | Graenacher | Mar. 18, 1941 |

FOREIGN PATENTS

| Number | Country | Date |
|---|---|---|
| 486,577 | Great Britain | 1938 |

OTHER REFERENCES

Bischler Berichte 22 (1889), pp. 2817–2818, 2808.

Arndt Berichte 50 (1917), pp. 1248–1261.

Parkes, Chem. Soc. J. 1938, pp. 1842 and 1843.